(12) United States Patent
Mathi et al.

(10) Patent No.: US 11,780,680 B2
(45) Date of Patent: Oct. 10, 2023

(54) VERTICAL CONVEYOR FOR A CONVEYING INSTALLATION

(71) Applicant: KNAPP AG, Hart bei Graz (AT)

(72) Inventors: Franz Mathi, Hart bei Graz (AT); Wolfgang Puntigam, Hart bei Graz (AT)

(73) Assignee: KNAPP AG, Hart bei Graz (AT)

( * ) Notice: Subject to any disclaimer, the term of this patent is extended or adjusted under 35 U.S.C. 154(b) by 0 days.

(21) Appl. No.: 17/596,726

(22) PCT Filed: Jun. 3, 2020

(86) PCT No.: PCT/AT2020/060221
§ 371 (c)(1),
(2) Date: Dec. 16, 2021

(87) PCT Pub. No.: WO2020/252509
PCT Pub. Date: Dec. 24, 2020

(65) Prior Publication Data
US 2022/0242674 A1    Aug. 4, 2022

(30) Foreign Application Priority Data

Jun. 17, 2019 (AT) .............................. A 50541/2019

(51) Int. Cl.
*B65G 29/02* (2006.01)
*B65G 47/57* (2006.01)
(Continued)

(52) U.S. Cl.
CPC ........... *B65G 29/02* (2013.01); *B65G 17/123* (2013.01); *B65G 47/57* (2013.01); *B65G 47/846* (2013.01); *B65G 47/84* (2013.01)

(58) Field of Classification Search
CPC ...... B65G 17/123; B65G 29/02; B65G 47/57; B65G 47/84; B65G 47/846
(Continued)

(56) References Cited

U.S. PATENT DOCUMENTS 3,992,855 A   11/1976 Palmieri et al.
4,643,633 A   2/1987  Lashyro
(Continued)

FOREIGN PATENT DOCUMENTS

AT      511860 A2    3/2013
CN   102341326 A  *  2/2012  ............. B65G 17/12
(Continued)

OTHER PUBLICATIONS

International Preliminary Report on Patentability received for PCT Patent Application No. PCT/AT2020/060221, dated Dec. 30, 2021, 17 pages (10 pages of English Translation and 7 pages of Original Document).

(Continued)

*Primary Examiner* — James R Bidwell
(74) *Attorney, Agent, or Firm* — Workman Nydegger (57) ABSTRACT

A vertical transfer device for a conveying device, including a main rotor operable to rotate about a node point for a conveyed goods support about a main axis of rotation (HA) extending horizontally, the node point being at a first distance from the main axis of rotation (HA) and the vertical transfer device is operable to keep the conveyed goods support horizontal during the rotation about the main axis of rotation (HA). The conveyed goods support is coupled at the node point of the main rotor by a compensation rotor that is operable to rotate the conveyed goods support about a compensation axis of rotation (AA) extending in parallel to the main axis of rotation (HA) through the node point, and
(Continued)

the conveyed goods support being at a second distance from the compensation axis of rotation (AA).

17 Claims, 4 Drawing Sheets

(51) Int. Cl.
*B65G 47/84* (2006.01)
*B65G 17/12* (2006.01)

(58) Field of Classification Search
USPC .................................................. 198/797, 801
See application file for complete search history.

(56) References Cited

U.S. PATENT DOCUMENTS

| | | | |
|---|---|---|---|
| 5,370,247 A * | 12/1994 | Handleman | ............ B65G 1/045 211/164 |
| 5,910,078 A | 6/1999 | Guttinger et al. | |
| 6,467,606 B1 | 10/2002 | Elent et al. | |
| 7,273,343 B2 * | 9/2007 | Ziegler | ................ B65G 47/915 198/474.1 |
| 10,246,256 B1 | 4/2019 | Martin et al. | |
| 2002/0110448 A1 | 8/2002 | Baclija et al. | |
| 2008/0298943 A1 * | 12/2008 | Siegel | ................ B65G 1/127 414/567 |
| 2018/0305123 A1 | 10/2018 | Lert, Jr. et al. | |

FOREIGN PATENT DOCUMENTS

| | | |
|---|---|---|
| DE | 102009006044 A1 | 8/2010 |
| DE | 102013104423 A1 | 10/2014 |
| EP | 0251032 A2 | 1/1988 |
| EP | 2529635 A2 | 12/2012 |
| EP | 3141501 A1 | 3/2017 |
| JP | 60-067322 A | 4/1985 |
| WO | 84/00144 A1 | 1/1984 |

OTHER PUBLICATIONS

International Search Report and Written Opinion received for PCT Patent Application No. PCT/AT2020/060221, dated Aug. 28, 2020, 20 pages (10 pages of English Translation and 10 pages of Original Document).

* cited by examiner

VERTICAL CONVEYOR FOR A CONVEYING INSTALLATION

The present application is a U.S. National Stage of International Application No. PCT/AT2020/060221, filed on Jun. 3, 2020, designating the United States and claiming the priority of Austrian Patent Application No. A50541/2019 filed with the Austrian Patent Office on Jun. 17, 2019. All of the aforementioned applications are incorporated herein in their respective entireties by this reference.

The invention relates to a vertical transfer device for a conveying device, comprising a main rotor designed for rotating at least one node point for a conveyed goods support about a main axis of rotation extending essentially horizontally, the node point being at a first distance from the main axis of rotation and the vertical transfer device being designed for keeping the conveyed goods support essentially horizontal during the rotation about the main axis of rotation.

For storage systems with high racks or for order picking systems, it is known to convey goods to be conveyed in a horizontal direction in order to bring conveyed goods such as filled boxes or packages to a desired location. For this purpose, automated belt conveyor paths or roller tracks are generally used, on which the goods to be conveyed can travel along. However, in order to move the goods to be conveyed in a vertical direction, e.g., to move the goods to be conveyed to a conveyor path that is located higher or lower, either ascending and descending sections or separate devices, so-called vertical transfer devices, must be used.

From AT 511 860 A2, for example, a vertical transfer device is known which picks up goods to be conveyed on a fork and transfers them to a higher located conveyor belt by means of a lifting movement. EP 3 141 501 A1 shows a lifting device by means of which goods to be conveyed can be lifted onto a higher located conveyor path by lifting a section of the conveyor path. The disadvantage of such vertical transfer devices is that they are very slow and do not allow continuous conveying movements, which limits the speed of the entire conveying system. Furthermore, their space requirement is very large.

U.S. Pat. No. 10,246,256 B1 discloses a vertical transfer device which enables a continuous conveying movement. For this purpose, two mutually offset rotary disks are used, between which conveyed goods supports are attached. The mutual offset enables the conveyed goods supports to always be in a horizontal position. However, this vertical transfer device has the disadvantage that it has a return stroke, i.e., with a vertical upward movement, the conveyed goods support is also moved in a horizontal direction, which may result in collisions of the goods to be conveyed with the conveyor path. In addition, the removal of the conveyed goods from the vertical transfer device is disadvantageous because of the continuous rotational movement and the associated consistent speed of the conveyed goods, which, in extreme cases, may cause damage to the conveyed goods.

Conveying devices with planetary gears are known from the documents US 2002/10448 A1, U.S. Pat. Nos. 4,643,633 A and 5,910,078 A. However, those conveying devices are unsuitable for some areas of application such as order picking systems, since the goods to be conveyed are engaged and twisted with vacuum suction cups.

The document DE 10 2009 006 044 A1 discloses a control gear of a so-called handling module. Accordingly, the control gear may comprise an internal gearwheel and a planetary gearwheel.

The document EP 0 251 032 A2 discloses an unpacking machine for bottles. In this case, the bottles are lifted out of the crate located on a first conveyor belt with a separate mechanism. Thereupon, the bottles are rotated about vertical axes with a planetary gear in order to take the bottles to a second conveyor belt which is located beside the first conveyor belt, in parallel thereto.

It is therefore the object of the invention to create a vertical transfer device which overcomes the disadvantages of the prior art and, in particular, has a small footprint without a return stroke.

Said object is achieved according to the invention by a vertical transfer device for a conveying device, comprising a main rotor designed for rotating at least one node point for a conveyed goods support about a main axis of rotation extending essentially horizontally, the node point being at a first distance from the main axis of rotation and the vertical transfer device being designed for keeping the conveyed goods support essentially horizontal during the rotation about the main axis of rotation, the conveyed goods support being coupled at the node point of the main rotor by means of a compensation rotor, the compensation rotor being designed for rotating the conveyed goods support about a compensation axis of rotation extending essentially in parallel to the main axis of rotation through the node point, and the conveyed goods support being at a second distance from the compensation axis of rotation.

This vertical transfer device allows to lift conveyed goods steadily in a vertical direction without, however, having a return stroke in doing so, i.e., the trajectory at which the goods to be conveyed move can be chosen so as to be essentially straight and does not have to run along a segment of a circle, as it was the case, for example, with the vertical transfer device of U.S. Pat. No. 10,246,256 B1.

In general, the trajectory of the conveyed goods support can be chosen freely and is not restricted to specific shapes. In this case, it is advantageous, however, if the main rotor and the compensation rotor are designed for rotating in opposite directions. As a result, the circular movement of the main rotor can be compensated for in order to, for example, generate a trajectory in the form of a polygon.

However, it is particularly preferred if the trajectory of the goods to be conveyed is roughly square. For this purpose, the compensation rotor is designed for rotating the conveyed goods support at a compensating angular velocity that is three times higher than a main angular velocity at which the main rotor rotates the node point, and wherein the first and second distances are chosen such that the conveyed goods support moves along an essentially square trajectory during the operation of the vertical transfer device. Most notably, the square trajectory involves the advantage that the conveyed goods support in this embodiment has a low speed in the area of the corners so that the goods to be conveyed can be moved onto and off the conveyed goods support particularly easily. This is advantageous in particular for the interaction with conveyor paths or for the application as an order picking station.

Furthermore, the vertical transfer device is preferably designed for moving the conveyed goods support only along essentially horizontal and vertical directions, i.e., the trajectory of the conveyed goods support is chosen such that it will be a square with vertical and horizontal sides. This is advantageous in particular when the vertical transfer device is used for classical embodiments of conveying devices, e.g., for Z-conveyors or C-conveyors. Furthermore, this embodiment is advantageous also for order picking stations, since, in that case, the goods to be conveyed can be supplied from below intuitively for a person performing the order picking, like in a lift, and can be removed horizontally like in a travel path.

The vertical transfer device can also be designed with a triangular trajectory, wherein the angular velocity of the compensation rotor is opposite and two times higher than that of the main rotor. With the same opposite angular velocity of the compensation rotor, a trajectory is achieved which displays two extremes during one revolution of the main rotor.

By changing the starting positions of the main rotor in relation to the compensation rotor, the trajectory can be rotated arbitrarily on the axis of the main rotor.

Depending on the embodiment, the compensation rotors could have their own energy supply via cables, sliding contacts, slip rings and/or battery, their own drive unit and their own control via cable or radio. However, it is advantageous if the vertical transfer device comprises a traction means connected to the main rotor and the compensation rotor, the traction means being designed for effecting the rotation of the compensation rotor from the rotation of the main rotor 6. The same applies to the horizontal stabilization of the conveyed goods support in that either the latter is equipped with one drive unit with position control and energy supply each, or preferably the stabilization of the conveyed goods support is achieved from the rotation of the compensation rotor by a stabilizing traction means. As a result, a system can be achieved in which only the main rotor has to be driven or, respectively, controlled. In particular, the preferred embodiment entails increased safety, since the entire vertical transfer device comes to a standstill by stopping the main rotor.

In the embodiment as mentioned, it is furthermore advantageous if the vertical transfer device comprises a transmission which is designed for converting the main angular velocity of the main rotor into the compensating angular velocity of the compensation rotor. As a result, the compensation rotors can be driven solely by mechanical elements of the vertical transfer device. Alternatively, it might also be provided that the compensation rotors have an internal transmission.

In order to move goods to be conveyed onto the vertical transfer device particularly easily, it is preferred if the conveyed goods support is a rigid fork, a fork formed by active conveyor components, e.g., a fork formed by conveyor rollers or belt tracks, or an active conveyor element, preferably a belt or rollers. If the conveyed goods support comprises its own active conveyor elements, such as a driven belt or rollers, the goods to be conveyed can be easily moved, for example, from a conveyor path onto the conveyed goods support.

Particularly preferably, the vertical transfer device comprises at least two to four of the above-mentioned conveyed goods supports, which are equally spaced around the main axis of rotation. In this way, the waiting time for an item to be conveyed onto a conveyed goods support can be shortened, or several goods to be conveyed can be moved at the same time. However, if there are more than four conveyed goods supports, the height and width of the conveyed goods to be moved in relation to the main rotor are severely restricted so that such embodiments are feasible only for very specific applications.

The vertical transfer device preferably comprises a rotor position sensor system which is designed for detecting the speed of the main rotor and/or the compensation rotor in order to delay or stop the movement of the conveyed goods support, preferably in one of the corner points of the trajectory. In this way, it can be achieved that goods to be conveyed can be removed from the vertical transfer device in a particularly simple and/or gentle manner if the conveyed goods support is located at a corner point of the trajectory.

According to the invention, a conveying device comprising a vertical transfer device according to one of the above-mentioned embodiments and at least one conveyor path can furthermore be created, with the conveyor path connecting to the vertical transfer device in such a way that an item to be conveyed can be moved largely steadily from the conveyor path to the conveyed goods support in at least one position of the conveyed goods support. This conveying device has especially the advantages of the vertical transfer device as explained above. Without a conveyor path, however, the vertical transfer device could still be loaded manually in order to move goods to be conveyed to a level that is located higher or lower.

The conveying device has additional advantages in particular when the vertical transfer device moves the conveyed goods support in a square trajectory, with the conveyor path connecting to a first corner point of the square trajectory of the conveyed goods support. The conveyor path is thus connected to a point at which the conveying device has a minimum speed, whereby goods to be conveyed can be moved more gently between the conveyed goods support and the conveyor path.

In a first preferred embodiment, the vertical transfer device comprises a further conveyor path connecting to a corner point of the square trajectory of the conveyed goods support which is opposite to the first corner point, whereby a Z-conveyor having the above-described advantageous properties can be achieved. If the further conveyor path connects to a corner point which is located above or below the corner point of the first-mentioned conveyor path, a C-conveyor having the above-described advantageous properties can be achieved in addition. In such a Z- or C-conveyor, the conveyor paths preferably run horizontally transversely to the main axis of rotation.

Especially Z-conveyors can also be designed in such a way that one or both conveyor paths run(s) parallel to the main axis of rotation. This is preferably achieved by an embodiment with a rigid fork as a conveyed goods support on the vertical transfer device and, depending on the orientation of the conveyor path, a diametrically opposed fork formed from belt tracks or rollers as the transfer surface. In addition to the vertical transport of the goods to be conveyed, a deflection of the conveyed flow by 90° is thus also achieved, seen from a bird's eye view, on the transfer surfaces formed with belt tracks.

In an alternative embodiment, the conveying device comprises three further conveyor paths, each conveyor path connecting to a different corner point of the square trajectory of the conveyed goods support. This four-way conveying device can in particular be used as a vertical switch between two conveyor paths lying parallel one above the other. In this case, it is hence preferred if the conveyor paths run normally to the main axis of rotation.

Furthermore, it is advantageous if the conveying device is an order picking station, wherein the vertical transfer device is designed for stopping the rotation of the main rotor and the compensation rotor when the conveyed goods support is located in a corner of the square trajectory, the corner being accessible to a person performing the order picking. As a result, goods to be conveyed can be conveyed, for example, from a lower transport level to the level of the staging area which is used as the order picking position, whereby the space requirement of the order picking station can be designed to be particularly small.

In the embodiment as mentioned, it is preferred if a control of the main rotor is connected to a control of the workstation and the control of the main rotor is preferably synchronized with a work progress at the workstation.

Advantageous and non-limiting embodiments of the invention are explained in further detail below with reference to the drawings.

Figure 1:
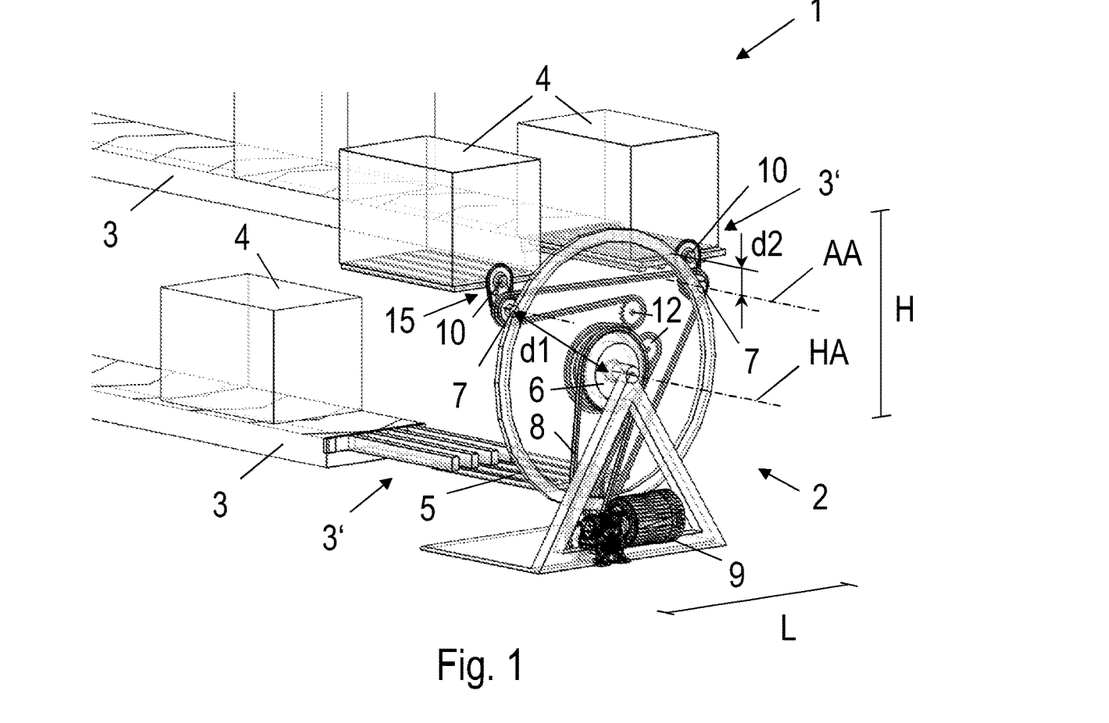
FIG. 1 shows a conveying device with a vertical transfer device according to the invention.

FIG. 1 shows a conveying device 1 comprising a vertical transfer device 2, with two conveyor paths 3 connecting thereto, which are located at different heights. In the example shown, the conveyor path 3 that is located lower conveys an item to be conveyed 4 in the direction of the vertical transfer device 2, which—as explained in detail below—lifts the item to be conveyed 4 to a height H, i.e., transfers it vertically. In addition, the vertical transfer device 1 in this embodiment displaces the item to be conveyed 4 by a horizontal length L. The terms "horizontal" and "vertical" are understood herein in relation to an operating position of the conveying device 1 or, respectively, the vertical transfer device 2.

The vertical transfer device 2 comprises three conveyed goods supports 5, which are designed as rigid forks, for lifting the goods to be conveyed 3, although only one or two conveyed goods supports 5 or even more than three conveyed goods supports 5 might also be provided. The transfer surfaces 3' of the two conveyor paths 3 are designed as diametrically opposed forks formed by belt tracks. For lifting the conveyed goods supports 5, the vertical transfer device 2 comprises a main rotor 6 on which node points 7 are coupled at intervals d1, the main rotor 6 being designed for rotating the node points 7 about a main axis of rotation HA extending essentially horizontally. For this purpose, the main rotor can be connected to a drive motor 9 via a belt 8, for example.

The main rotor 7 can be designed, for example, as a rotary disk with a radius d1 or perhaps as a ring with struts, the node points 7 being present on the outer diameter of the rotary disk or the ring, respectively. Alternatively, only struts could also be provided as spacers for the node points 7, each strut having a length d1, so that the struts rotate jointly about the main axis HA.

Each conveyed goods support 5 is coupled to a different node point 7 of the main rotor 6 by means of a compensation rotor 10 so that the conveyed goods support 5 assumes a second distance d2 from the node point 7. The compensation rotors 10 rotate the respective conveyed goods support 5 about a compensation axis of rotation AA, which runs essentially horizontally through the respective node point 7 in parallel to the main axis of rotation HA. The compensation rotors 10 have the function of compensating for the circular movement of the main rotor 6, as will be explained below.

Figure 2:
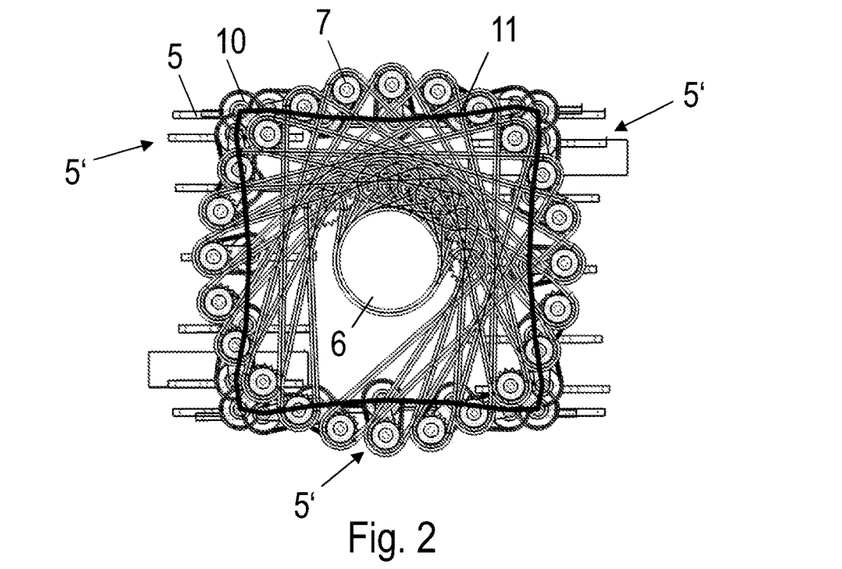
FIG. 2 shows a square trajectory of an item to be conveyed, which is conveyed by means of the vertical transfer device.

FIG. 2 shows that the conveyed goods support 5 moves due to the rotation of the respective compensation rotor 10 relative to the main rotor 6 along an essentially square trajectory 11. In this regard, FIG. 2 shows a 120° rotation of a main rotor in increments of 15° in a superimposed state with three equally distributed node points 7, each with a compensation rotor 10 comprising a conveyed goods support 5. Thus, twenty-four (24) different positions of the conveyed goods support 5 are apparent during a single complete revolution of the main rotor 6.

In order to achieve the square trajectory 11, the main rotor 6 and the compensation rotor 10 rotate in opposite directions, one clockwise and one counterclockwise. The compensation rotor 10 rotates the conveyed goods support 5 at a compensating angular velocity $\omega_2$ that is three times higher than a main angular velocity $\omega_1$ at which the main rotor 6 rotates the node point 7, whereby an essentially square trajectory is achieved together with the selection of $d2=20\%*d1$.

In FIG. 2, the conveyed goods supports 5' are in the same positions as shown in FIG. 1.

Furthermore, the vertical transfer device 2 is arranged in FIG. 2 in such a way that the conveyed goods support 5 is only moved essentially horizontally and vertically. For this purpose, the compensation rotor 10 keeps the conveyed goods support 5 at a position as low as possible when the main rotor 6 keeps the node point 7 at a position as high as possible. Alternatively, it would also be possible to set other orientations of the square trajectory 11, for example, in order to bring the corners of the trajectory 11 horizontally and vertically into positions deflected as far as possible, i.e., the square is placed on one of the corners.

Figure 3:
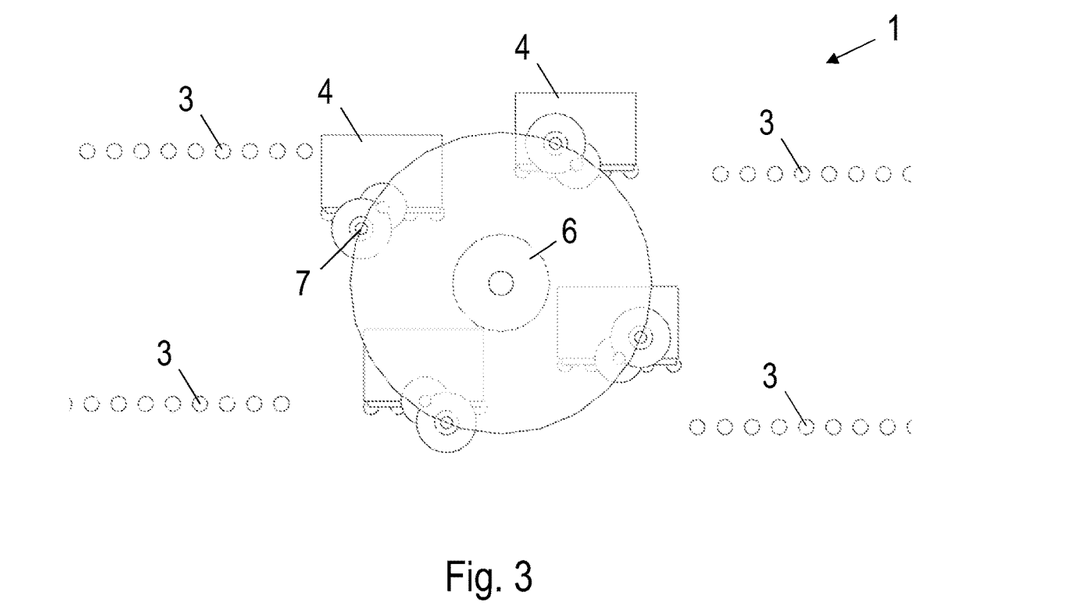
FIG. 3 shows a conveying device in an embodiment which is an alternative to FIG. 1.

The conveyor paths 3 in FIG. 3 are positioned in such a way that the conveyed goods supports 5 pass vertically and perform the horizontal movement above the upper conveyor path or, respectively, below the lower conveyor path, whereby easy transfer of the conveyed goods from the conveyor path 3 to the vertical transfer device 2 and easy delivery from the vertical transfer device 2 to the conveyor path 3 become possible.

In general, the main rotor 6 and the compensation rotor 10 are designed for rotation by an angle of 360° so that they rotate, for example, periodically about the respective main axis of rotation HA or the compensation axis of rotation AA. Alternatively, the angular range about which the main rotor 6 or, respectively, the compensation rotor 10 rotates could also be restricted so that the trajectory 11 is formed, for example, only by the left or right vertical line of the square shown in FIG. 2.

As a result of an uneven or discontinuous compensating angular velocity $\omega_2$ of the compensation rotor 10, asymmetrical or, respectively, other forms of the trajectory 11 can also be generated. For example, the square trajectory 11 of FIG. 2 could be modified in such a way that the compensation rotor 10 assumes a position in the lower left corner of the trajectory in which the conveyed goods support 5 faces the main axis of rotation HA.

Returning to FIG. 1, it is evident that the main rotor 6 and the compensation rotors 10 are connected to a traction means 12, for example, in a non-positive way with a belt, or positively with a chain or toothed belt. The rotation of the main rotor 6 can thereby be transmitted to the compensation rotors 10. In one embodiment, no external transmission is provided, and the compensation rotors 10 themselves have, for example, an internal control of the compensating angular velocity $\omega_2$. However, the vertical transfer device 2 preferably possesses transmissions in order to mechanically convert the main angular velocity $\omega 1$ into the compensating angular velocity $\omega 2$. As illustrated in FIG. 1, the vertical transfer device may comprise for this purpose, for example, chain wheels or tooth lock washers in combination with a traction means.

Moreover, the vertical transfer device 2 is designed for keeping the conveyed goods support 5 essentially horizontal during the rotation about the main axis of rotation HA or, respectively, the compensation axis of rotation AA so that the goods to be conveyed 4 will not slip off the conveyed goods support. This can be achieved either by an additional main rotor 6 that is arranged so as to be offset, as is known from the prior art. For this purpose, however, a suitable stabilizing device is preferably provided, e.g., a positive coupling of the conveyed goods support 5 with the respective node point 7 by means of a stabilizing traction means 15 on the respective compensation rotor 10.

The vertical transfer device 2 can be used even if no conveyor paths 3 are connected to it. For this purpose, it can be loaded and unloaded manually, for example. For use in a conveying device 1, however, at least one conveyor path 3 connects to the vertical transfer device 2 in such a way that the goods to be conveyed 4 can be moved, e.g., displaced, essentially steadily from the conveyor path 3 onto the conveyed goods support 5 in at least one position of the conveyed goods support 5 as it rotates about the main axis of rotation HA or, respectively, the compensation axis of rotation AA, which means in this regard that the conveyor path 3 and the conveyed goods support together form a flat surface in the position as mentioned. If the vertical transfer device 2 has a square trajectory 11, it is preferred if the conveyor path 3 connects to a first corner point of the square trajectory 11 of the conveyed goods support 5, since the latter has a particularly slow speed there due to the reversal point of the rotational movements of the main rotor 6 and the compensation rotor 10.

The conveyor path 3 can, for example, be a driven conveyor belt which automatically moves the conveyed goods 4 in the direction of the vertical transfer device 2 or away from it. Alternatively, the conveyor path 3 can be formed, for example, by rollers, as illustrated schematically in FIG. 3. The rollers can be designed to be non-driven or driven.

As shown in the embodiment of FIG. 1, the conveyed goods support 5 can be designed as a rigid fork which interacts with an appropriately diametrically opposed rigid fork of the conveyor path 3. If the conveyed goods support 5 is thus in a position in which it is as close as possible to the conveyor path 3, the goods to be conveyed 4 can be steadily passed from the conveyor path 3 onto the conveyed goods support 5. The fork engagement between the conveyed goods support 5 and the conveyor path 3 has the advantage that the goods to be conveyed 4 can be placed on the fork of the conveyor path 3 in advance and can then be automatically picked up by the conveyed goods support 5 as soon as the conveyed goods support 5 assumes the corresponding position.

Alternatively, the conveyed goods support 5 could be designed so as not to engage with the conveyor path 3, but could merely connect thereto. FIG. 3 shows such an embodiment in which the conveyed goods support 5 consists of driven rollers. The rollers of the conveyed goods support 5 connect flush with the rollers of the conveyor path 3. Alternatively, the conveyed goods support 5 could be a rigid plate, non-driven rollers or another active conveyor element such as, for example, a conveyor belt.

The conveyed goods support 5 is designed in such a way that the goods to be conveyed 4 can be transferred in a stable manner by the vertical transfer device 2, wherein the goods to be conveyed 4 should, in particular, not be displaced or shifted by the transverse forces arising during the horizontal movement. For this reason, precautions can be taken to brake the rollers, especially when the rollers are not driven. It has turned out to be advantageous in this case to automatically release the brake at the positions where the goods to be conveyed are taken over or, respectively, the goods to be conveyed are transferred to the conveyor path 3 in order to enable the goods to be conveyed 4 to be pushed over more easily.

Depending on the point of the trajectory 11 at which the conveyor paths 3 connect to the vertical transfer device 2, different types of conveying devices 1 can be obtained. If one of the conveyor paths 3 connects to a first corner point of the square trajectory 11 of the conveyed goods support 5 and a second conveyor path 3 connects to a corner point of the square trajectory 11 which is opposite to the first corner point, a so-called Z-conveyor can be achieved. By contrast, if the second conveyor path 3 connects to a corner point 3 of the square trajectory 11 which is located above or below the first corner point, a so-called C-conveyor can be achieved.

With Z-conveyors or C-conveyors, the conveyor paths 3 preferably run normally to the main axis of rotation HA. The vertical transfer device 2 also allows an embodiment in which, according to FIG. 1, the conveyor paths 3 run parallel to the main axis of rotation HA, whereby a reversal point of the conveying device 1 can be achieved by the vertical transfer device 2.

As shown in FIG. 3, the vertical transfer device 2 can also be used as a switch between two conveyor paths 3 running one above the other. In this case, there are a total of four conveyor paths 3, each conveyor path connecting to a different corner point of the square trajectory 11 of the conveyed goods support 5. In contrast to the embodiment of FIG. 1, the conveyor paths 3 run in this case normally to the main axis of rotation HA. In the illustrated example, at least one of the operated conveyor paths 3 must be run as a withdrawing conveyor path and at least one as an incoming conveyor path, whereby the vertical transfer device 2 is usable as a 2:2 crossover, a 1:3 division or a 3:1 merge. In the illustrated example, it is advantageous in some fields of application if the direction of rotation of the main rotor 3 can be reversed, since a simple way of conveying the goods to be conveyed 4 vertically or horizontally over the shortest route is thereby established. However, the possibility of reversing the direction of rotation can also be used in other embodiments.

Figure 4:
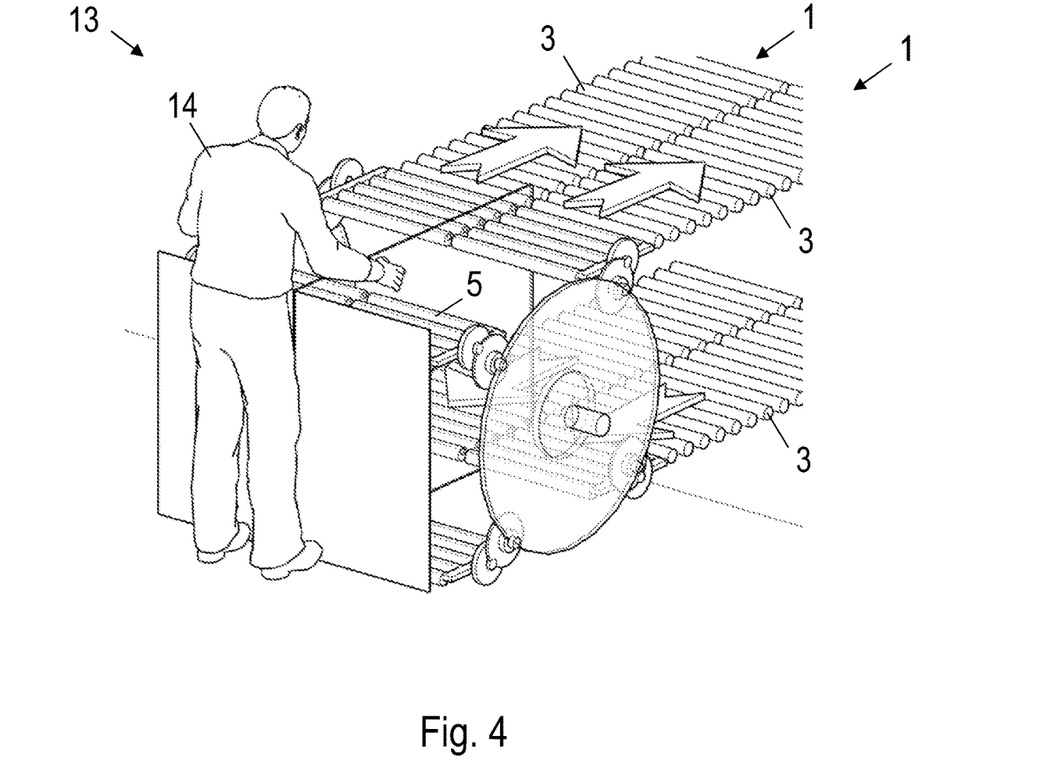
FIG. 4 shows an order picking station according to the invention comprising the vertical transfer device according to the invention.

FIG. 4 shows the use of the conveying device 1 as an order picking station 13. The latter is designed in such a way that the conveyed goods support 5 is accessible to a person performing the order picking 14 at a position in an upper corner of the square trajectory 11. In order to give the person performing the order picking 14 time to process the goods to be conveyed 4, the main rotor 6 and the compensation rotor 10 stop their rotation about the respective axis HA, AA when the conveyed goods support 5 is in the stated position.

In the illustrated example, goods to be conveyed 4 are supplied from a lower level to the vertical transfer device 2. By rotating the main rotor 6 clockwise and the compensation rotor 10 counterclockwise, the goods to be conveyed 4 are raised essentially vertically to a height H which is easily accessible to the person performing the order picking 14. At this point, the rotation is advantageously interrupted for a period of time which is either predetermined or determined by the person performing the order picking 14, for example, by actively switching on the vertical transfer device 2 by pressing a button. Thereupon, the rotation of the main rotor 6 and the compensation rotor 10 is continued, each in the direction as mentioned, in order to discharge the conveyed goods 4 onto a conveyor path 3 on an upper level.

In the embodiment of FIG. 4, a second vertical transfer device 2 is additionally arranged in order to create a second conveying device 1. In this order picking system, the first conveying device 1 can deliver a package to be filled, for example. The second conveying device 1 delivers conveyed goods 4 which contain objects which are placed in the package by the person performing the order picking 14. Thereupon, the first conveying device 1 can remove the package from the order picking station 13 and deliver the next empty package. In this embodiment, the rotation of the two transfer devices 2 is taken over by a computer-aided control, wherein the order picker confirms that order picking has taken place and the control then changes the package to be filled or the source goods to be conveyed or both by activating the respective main rotor 6.

As an alternative to the above-mentioned embodiments in which the trajectory 11 is designed as a square, other shapes can be achieved as well. For example, the angular velocities ω1, ω2 and the distances d1, d2 can be chosen such that an ellipse, a triangle, a pentagon or another regular polygon is obtained.

Figure 5A:
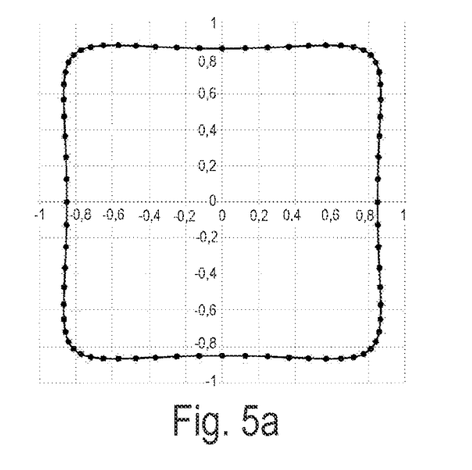
FIGS. 5a to 5f show different feasible trajectories in relation to differently dimensioned compensation rotors.
Figure 5B:
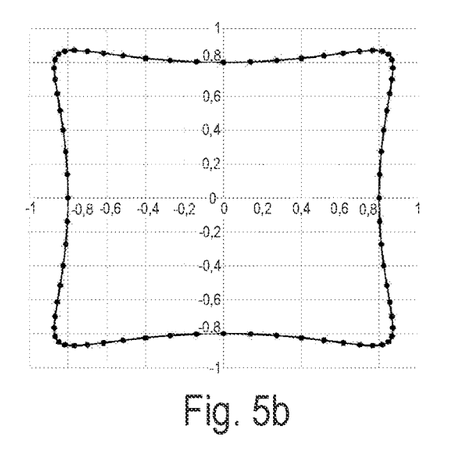
Figure 5C:
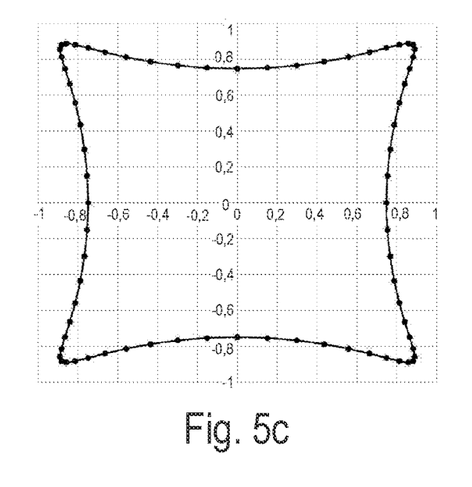

Six exemplary trajectories are illustrated in FIGS. 5a to 5f. FIGS. 5a to 5c each show essentially square trajectories 11, wherein the conveyed goods support 5 is moved only along essentially horizontal and vertical directions. According to FIG. 5a, ω2=−3*ω1 and d2=15%*d1. According to FIG. 5b, ω2=−3*θ1 and d2=20%*d1. In FIG. 5c, ω2=−3*ω1 and d2=25%*d1.

Figure 5D:
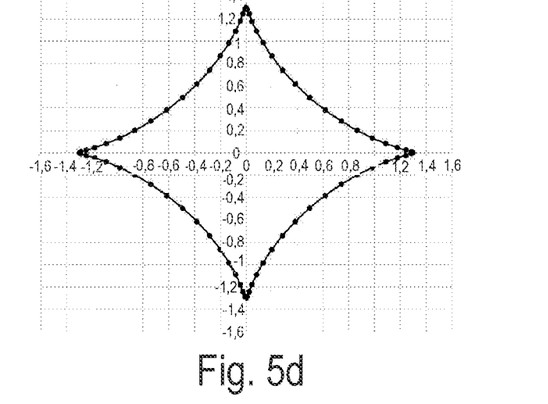

FIG. 5d shows an essentially square trajectory 11, the corners of the trajectory 11 being moved horizontally and vertically into positions deflected as far as possible. In this case, ω2=−3*ω1 and d2=30%*d1.

In general, ω2=−3*ω1 is selected for square trajectories, wherein the ratio d2/d1 can be 10% to 40%, preferably 17% to 18%.

Figure 5E:
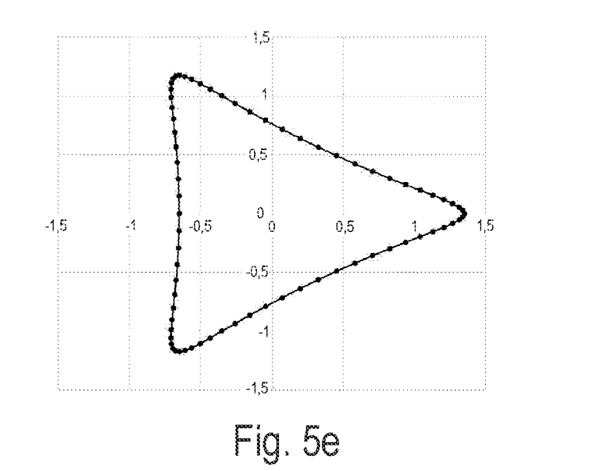

FIG. 5e shows an essentially triangular trajectory 11 with ω2=−2*ω1 and d2=30%*d1. In general, ω2=−2*ω1 is selected for triangular trajectories, wherein the ratio d2/d1 can be 20% to 60%, preferably 25% to 35%. For an essentially pentagonal trajectory 11, ω2=−4*ω1 is selected, wherein the ratio d2/d1 can be 10% to 40%, preferably 15% to 20%.

Figure 5F:
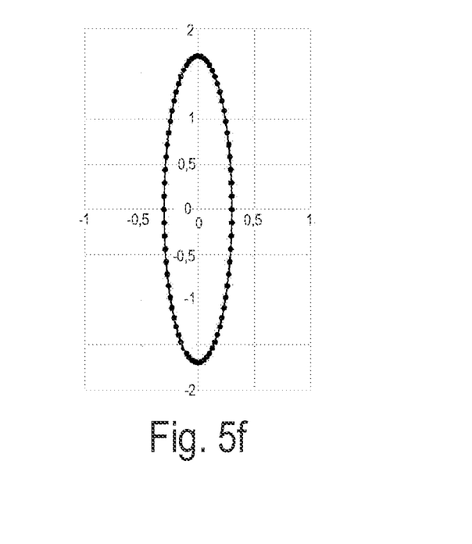

According to FIG. 5f, an elliptical trajectory 11 can also be achieved with ω2=−1*ω1 and d2=70%*d1. In general, ω2=−1*ω1 is selected for elliptical trajectories, wherein the ratio d2/d1 can be 10% to 200%, preferably 60% to 80%. In this case, d1=d2 constitutes a special case in which a linear, preferably vertical, movement of the conveyed goods support is achieved. In this regard, it should be noted that only one conveyed goods support 5 can be used.

The invention claimed is:

1. A vertical transfer device for a conveying device, comprising a main rotor operable to rotate at least one node point for a conveyed goods support about a main axis of rotation extending horizontally, the node point being at a first distance from the main axis of rotation and the vertical transfer device being operable to keep the conveyed goods support horizontal during the rotation about the main axis of rotation, wherein the conveyed goods support is coupled at the node point of the main rotor by a compensation rotor, the compensation rotor being operable to rotate the conveyed goods support about a compensation axis of rotation extending in parallel to the main axis of rotation through the node point, and the conveyed goods support being at a second distance from the compensation axis of rotation, wherein the main rotor and the compensation rotor are operable to rotate in opposite directions, wherein the compensation rotor is operable to rotate the conveyed goods support at a compensating angular velocity that is three times higher than a main angular velocity at which the main rotor rotates the node point, and wherein the first and second distances are chosen such that the conveyed goods support moves along a square trajectory during the operation of the vertical transfer device.

2. A vertical transfer device according to claim 1, wherein the vertical transfer device is operable to move the conveyed goods support only along horizontal and vertical directions.

3. A vertical transfer device according to claim 1, further comprising a traction device connected to the main rotor and the compensation rotor, the traction device being operable to effect the rotation of the compensation rotor from the rotation of the main rotor.

4. A vertical transfer device according to claim 3, further comprising a transmission operable to convert the main angular velocity of the main rotor into the compensating angular velocity of the compensation rotor.

5. A vertical transfer device according to claim 1, wherein the conveyed goods support is a rigid fork, a fork formed by active conveyor components, or an active conveyor element.

6. A vertical transfer device according to claim 5, comprising at least two of the conveyed goods supports, the associated node points thereof being arranged around the main axis of rotation in an equally distributed manner.

7. A vertical transfer device according to claim 1, further comprising a rotor position sensor system operable to detect the speed of the main rotor and/or the compensation rotor in order to delay or stop the movement of the conveyed goods support.

8. A conveying device comprising a vertical transfer device according to claim 1, and further comprising at least one conveyor path connecting to the vertical transfer device in such a way that an item to be conveyed is steadily movable from the conveyor path to the conveyed goods support in at least one position of the conveyed goods support.

9. A conveying device according to claim 8, wherein, in operation, the conveyed goods support moves along a square trajectory during the operation of the vertical transfer device and wherein the conveyor path connects to a first corner point of the square trajectory of the conveyed goods support.

10. A conveying device according to claim 9, comprising a further conveyor path connecting to a corner point of the square trajectory of the conveyed goods support which is opposite to the first corner point.

11. A conveying device according to claim 9, comprising a further conveyor path connecting to a corner point of the square trajectory of the conveyed goods support which is located above or below the first corner point.

12. A conveying device comprising a vertical transfer device according to claim 1, and further comprising at least two conveyor paths, each conveyor path connecting to a different corner point of the trajectory of the conveyed goods support.

13. A conveying device according to claim 8, wherein at least one of the conveyor paths runs parallel to the main axis of rotation.

14. A conveying device according to claim 8, wherein at least one of the conveyor paths runs normally to the main axis of rotation.

15. A conveying device comprising a vertical transfer device according to claim 1, wherein the conveying device is part of a workstation and wherein the vertical transfer device is operable to stop the rotation of the main rotor and the compensation rotor when the conveyed goods support is located in a corner of the trajectory which faces a person performing the order picking.

16. A conveying device according to claim 15, wherein a control of the main rotor is connected to a control of the workstation and the control of the main rotor is synchronized with a work progress at the workstation.

17. A vertical transfer device for a conveying device, comprising a main rotor operable to rotate about at least one node point for a conveyed goods support about a main axis of rotation extending horizontally, the node point being at a first distance from the main axis of rotation and the vertical transfer device being operable to keep the conveyed goods support horizontal during the rotation about the main axis of rotation, wherein the conveyed goods support is coupled at the node point of the main rotor by a compensation rotor, the compensation rotor being operable to rotate the conveyed goods support about a compensation axis of rotation extending in parallel to the main axis of rotation through the node point, and the conveyed goods support being at a second distance from the compensation axis of rotation, wherein the main rotor and the compensation rotor are operable to rotate in opposite directions, wherein the compensation rotor is operable to rotate the conveyed goods support at a compensating angular velocity that is three times higher than, two times higher than, or equal to, a main angular velocity at which the main rotor rotates the node point, and wherein the first and second distances are chosen such that the conveyed goods support moves along a square, triangular or linear trajectory during the operation of the vertical transfer device, wherein at least a part of the trajectory runs along a vertical direction.

* * * * *